(12) United States Patent
Keim

(10) Patent No.: US 8,425,214 B2
(45) Date of Patent: Apr. 23, 2013

(54) SPRAYING TOOL WITH A SWITCH-OFF VALVE

(75) Inventor: Karl-Heinrich Keim, Neu-Ulm (DE)

(73) Assignee: AED Automation GmbH, Dornstadt (DE)

( * ) Notice: Subject to any disclaimer, the term of this patent is extended or adjusted under 35 U.S.C. 154(b) by 300 days.

(21) Appl. No.: 12/652,363

(22) Filed: Jan. 5, 2010

(65) Prior Publication Data

US 2010/0155509 A1 Jun. 24, 2010

Related U.S. Application Data

(63) Continuation of application No. PCT/EP2008/005499, filed on Jul. 4, 2008.

(30) Foreign Application Priority Data

Jul. 5, 2007 (DE) .......................... 10 2007 031 263

(51) Int. Cl.
   *B05B 1/14* (2006.01)
(52) U.S. Cl.
   USPC .................. 425/96; 425/90; 425/91; 425/92; 425/100; 239/550; 239/556; 239/569; 239/570; 427/133; 427/135; 427/236; 427/421.1
(58) Field of Classification Search .............. 425/6, 90, 425/91, 92, 96, 98, 100, 103, 107; 239/66, 239/261, 550, 551, 556, 562, 569, 570, 589; 164/72, 149, 267; 427/133, 134, 135, 236, 427/421.1; 137/512.15
   See application file for complete search history.

(56) References Cited

U.S. PATENT DOCUMENTS 3,325,138 A * 6/1967 Connolly .......................... 251/5
3,445,085 A * 5/1969 Hildebrandt et al. ............. 251/5
(Continued)

FOREIGN PATENT DOCUMENTS

DE 37 09 563 A1 10/1988
DE 195 11 272 A1 10/1996
(Continued)

OTHER PUBLICATIONS

German Search Report Dated Apr. 17, 2008, Application No. 10 2007 031 263.8, Applicant: Acheson Industries Deutschland, 8 Pages.

(Continued)

*Primary Examiner* — Joseph Del Sole
*Assistant Examiner* — Seyed Masoud Malekzadeh
(74) *Attorney, Agent, or Firm* — Greenblum & Bernstein, P.L.C.

(57) ABSTRACT

The invention relates to a spraying tool, in particular as part of a mold-spraying device for spraying at least one section of a wall of a mold with working medium. In at least one embodiment, the spraying tool comprises a plurality of spraying elements for dispensing working medium, and at least one working-medium supply line which supplies working medium to the plurality of spraying elements. In accordance with at least one embodiment, at least some of the spraying elements, the spraying nozzles of which point downwards during operation, are equipped with a separate valve unit which is adjacent to the spraying nozzle and the valve element of which is prestressed elastically into a closed position in which it prevents the dispensing of working medium, but can be transferred under the action of a hydraulic and/or pneumatic pressure into an open position in which it permits the dispensing of working medium.

18 Claims, 3 Drawing Sheets

U.S. PATENT DOCUMENTS

| | | | |
|---|---|---|---|
| 3,941,537 A * | 3/1976 | Abraham | 425/228 |
| 4,230,270 A * | 10/1980 | Poret | 239/67 |
| 4,605,170 A * | 8/1986 | Thurner | 239/444 |
| 4,707,309 A * | 11/1987 | Voss et al. | 264/12 |
| 4,758,142 A * | 7/1988 | Voss et al. | 425/7 |
| 4,770,225 A * | 9/1988 | Takagi et al. | 164/305 |
| 5,388,631 A * | 2/1995 | Suganuma et al. | 164/72 |
| 5,494,094 A * | 2/1996 | Jacobsen | 164/187 |
| 5,524,829 A * | 6/1996 | Keim et al. | 239/533.15 |
| 5,603,984 A * | 2/1997 | Keim et al. | 427/133 |
| 5,762,103 A | 6/1998 | Gregoire | |
| 5,785,252 A * | 7/1998 | Keim et al. | 239/418 |
| 6,192,968 B1 * | 2/2001 | Renkl et al. | 164/121 |
| 6,902,758 B2 * | 6/2005 | Donatti et al. | 427/133 |
| 6,968,863 B1 * | 11/2005 | Roffelsen | 137/860 |
| 7,290,426 B2 * | 11/2007 | Landvatter et al. | 72/342.3 |
| 7,448,555 B2 * | 11/2008 | Wollin | 239/296 |
| 2007/0090554 A1 * | 4/2007 | Wykoff et al. | 264/102 |
| 2010/0021578 A1 * | 1/2010 | Coleman et al. | 425/3 |

FOREIGN PATENT DOCUMENTS

| | | |
|---|---|---|
| DE | 694 17 664 T2 | 7/1999 |
| DE | 198 29 124 A1 | 8/1999 |
| DE | 10 2006 004 107 A1 | 9/2006 |
| EP | 0 734 780 | 10/1996 |
| EP | 0 941 788 A2 | 9/1999 |
| EP | 1 439 004 A2 | 7/2004 |
| JP | 49-111486 | 9/1974 |
| JP | 02020651 A * | 1/1990 |
| JP | 06269917 A * | 9/1994 |
| JP | 10-085888 | 10/1995 |
| JP | 09-225354 | 9/1997 |
| JP | 07-256188 | 4/1998 |
| WO | 00/19134 A1 | 4/2000 |

OTHER PUBLICATIONS

European International Search Report Dated Sep. 1, 2008, Application No. PCT/EP/2008/005499, 6 Pages.

* cited by examiner

SPRAYING TOOL WITH A SWITCH-OFF VALVE

CROSS-REFERENCE TO RELATED APPLICATIONS

This application is a continuation of PCT application Serial No. PCT/EP2008/005499 filed on Jul. 4, 2008, which claims priority to German application Serial No. 10 2007 031 263.8 filed Jul. 5, 2007 which are hereby incorporated by reference in their entirety.

BACKGROUND OF THE INVENTION

1. Field of the Invention

The invention relates to a spraying tool, in particular as part of a mold spraying device for spraying at least a section of a mold wall of a mold with a working medium, comprising:
   a plurality of spray elements for dispensing a working medium, and
   at least one working medium supply line, which supplies working medium to the plurality of spray elements.

2. Background Art

One possible application for using such a spraying tool is as a mold spraying device such as that used after a working cycle to prepare the walls of the mold halves of a drop-forging device for the next working cycle. To do so, the walls of the two mold halves are sprayed with a working medium. Two problems arise here with modern drop-forging devices, namely first the short cycle times of only approximately 1 to 2 seconds per forged molded part, and secondly, the small installation space available for inserting the spraying tool between the mold halves of the drop-forging device.

To be able to accommodate the aforementioned short cycle times, both mold halves of the drop-forging device must be sprayed with working medium at the same time. To do so, however, it is necessary for the spraying tool to be equipped with a plurality of spray elements on two surfaces facing in opposite directions. This doubling has corresponding consequences for the dimensions of the individual spray elements. Furthermore, the aforementioned short cycle times do not allow the two mold halves of the drop-forging device to move a great distance from one another because this would take too much time. Depending on the size of the molded parts produced in the drop-forging device, an installation space of only approximately 40 mm to approximately 80 mm is available for the height of the spraying tool.

A spraying tool having spray elements operated according to the internal mixing principle is known in the prior art, where the main body of the spray element comprising the mixing chamber is screwed into a base part of the spraying tool. The working medium is supplied to the plurality of spray elements from a shared switch-off valve via a channel system. It is therefore unavoidable that a residue of working medium remains in the channel system after spraying the mold halves of the drop-forging device. If the spraying tool is then extracted from the space between the two mold halves of the drop-forging device at a high speed, it may happen that due to inertia, a portion of the working medium escapes from the spray element in an unwanted manner without being atomized and then drips into one of the mold halves of the drop-forging device. Since too much working medium is introduced into the drop-forging device in this way, there is the risk of damage to the drop-forging device.

One of the objects of the invention is therefore to provide a spraying tool of the type defined in the beginning, with which the unwanted escape of working medium during operation is at least reduced in comparison with the prior art, if not being completely prevented.

SUMMARY OF THE INVENTION

This object is achieved according to at least one embodiment of the invention by a spraying tool of the type defined in the beginning, in which at least a portion of the spray elements on which the spray nozzle points downward during operation are equipped with a separate valve unit next to the spray nozzle, its valve element being elastically prestressed into a closed position, in which it stops the dispensing of working medium but can be transferred to an open position, in which position it allows the working medium to be dispensed, under the action of a hydraulic and/or pneumatic pressure. Through this measure, the quantity of working medium capable of passing through the spray nozzle under the influence of inertia in a movement of the spraying tool may at least be significantly reduced.

Since the valve units arranged next to the spray nozzles are additional components in comparison with the prior art, an additional installation space must also be provided for them. However, since no additional installation space is available because of the circumstances explained above, this installation space must be saved elsewhere. This may be accomplished by a number of measures, which may be implemented individually or in combination with one another in a further embodiment of the invention.

For example, it is possible to provide for the spray element to atomize the working medium with the help of an auxiliary medium, e.g., air, according to the external mixing principle or without the use of an auxiliary medium. In this way, the installation space required for the internal mixing chamber may be omitted.

Additionally or alternatively, it is possible to provide for the valve unit to be accommodated in a pot-shaped clearance in a main body of the spraying tool and to be secured therein by a cover plate of the spraying tool. This allows a thread-free design of the valve unit and thus eliminates the installation space required for a thread.

In a further embodiment of the invention, the cover plate of the spraying tool may also be used independently of the thread-free design of the valve unit to keep the spray nozzle or at least a portion of the spray nozzle having the valve unit in operational connection. Separate connecting elements may be omitted in this way. The spray nozzle or at least a portion of the spray nozzle may be screwed to the cover plate according to one embodiment variant. This embodiment variant has the advantage that it is not necessary to remove the entire cover plate from the spraying tool to gain access to an individual valve unit, so this facilities maintenance of the spraying tool. According to an alternative embodiment variant, the spray nozzle or at least a portion of the spray nozzle may also be inserted loosely into a clearance in the cover plate, preferably from the inside of the cover plate, or held by friction in this clearance, e.g., by being pressed into it. This alternative embodiment variant has the advantage that it is simpler to manufacture due to the omission of a thread on the spray nozzle.

The valve unit itself may also be designed with a simple design and thus in a manner that saves on installation space in the axial direction in particular. For example, the valve unit may have a working medium inlet channel, which can be brought into connection with the working medium supply line at the inlet end and from whose other end emerges a tapping channel opening into a valve chamber, such that again at least one dispensing channel of this valve chamber leads to an outlet opening of the valve unit, and the valve element is accommodated in the valve chamber. The wall section into which the at least one channel opens forms the valve seating surface for the valve element.

To be able to easily provide the elastic prestress of the valve element, i.e., in particular without having to provide additional elements, e.g., springs or the like, in a further embodiment of the invention it is proposed that the valve element be formed of rubber material. The inherent elasticity of the rubber material is manifested in particular when the valve seating surface is formed on the outside circumference of the valve unit and is surrounded by a ring-shaped valve element.

If the cross section of the valve element is designed to be rectangular, whereby preferably at least one of the two lines connecting neighboring corners is designed to be concave, then a sealing guidance of the valve element on the valve unit can easily be ensured in this way, because the corners bordering the concave line act as sealing lips. Such elements are known by the term "quad ring," for example. Essentially, however, it is also conceivable to use a simple O-ring having a circular cross section.

However, additionally or alternatively, unwanted leakage of working medium can also be counteracted by providing at least one sealing element on each side of the valve element, as seen in the direction of extent of the working medium supply channel.

If desired, the effect of the elastic prestress of the valve element can be supported by a control medium, e.g. compressed air, acting on the valve element in the closing direction.

To simplify the production of the spraying tool, the so-called sandwich design may be used in an essentially known manner. For example, the working medium supply line may be designed in a main body of the spraying tool as a recess provided in a surface of this main body, such that another plate covers the recess to form the working medium supply line. Furthermore, a blasting air supply line may also be formed in the main body of the spraying tool as a recess, which is provided in a surface of this main body opposite the one surface. This recess may be covered by the cover plate to form the blasting air supply line, for example. Finally, it has proven advantageous if two main bodies are provided, preferably separated from one another by a dividing plate, their spray elements dispensing working medium in essentially opposite directions.

In addition, the spray elements need not necessarily be arranged in straight rows but instead may also be arranged to conform to the geometry of the mold halves. In this way, the contours of the mold halves of the shaping device, in particular the drop-forging device, may be prepared much more effectively for the next working cycle, e.g., cooled more effectively and coated with lubricant.

It should also be added that through the use of pressure-proportional valves, continuously variable control of the quantity of working medium dispensed can be ensured.

To illustrate the differences between the external mixing principle and the internal mixing principle, reference shall be made to DE 195 11 272 A1, whose disclosure in this regard is herewith made part of the disclosure content of the present patent application.

BRIEF DESCRIPTION OF THE DRAWINGS

The invention is explained in greater detail below on the basis of an exemplary embodiment with reference to the accompanying figures, in which.

DETAILED DESCRIPTION OF THE EMBODIMENTS

Figure 1:
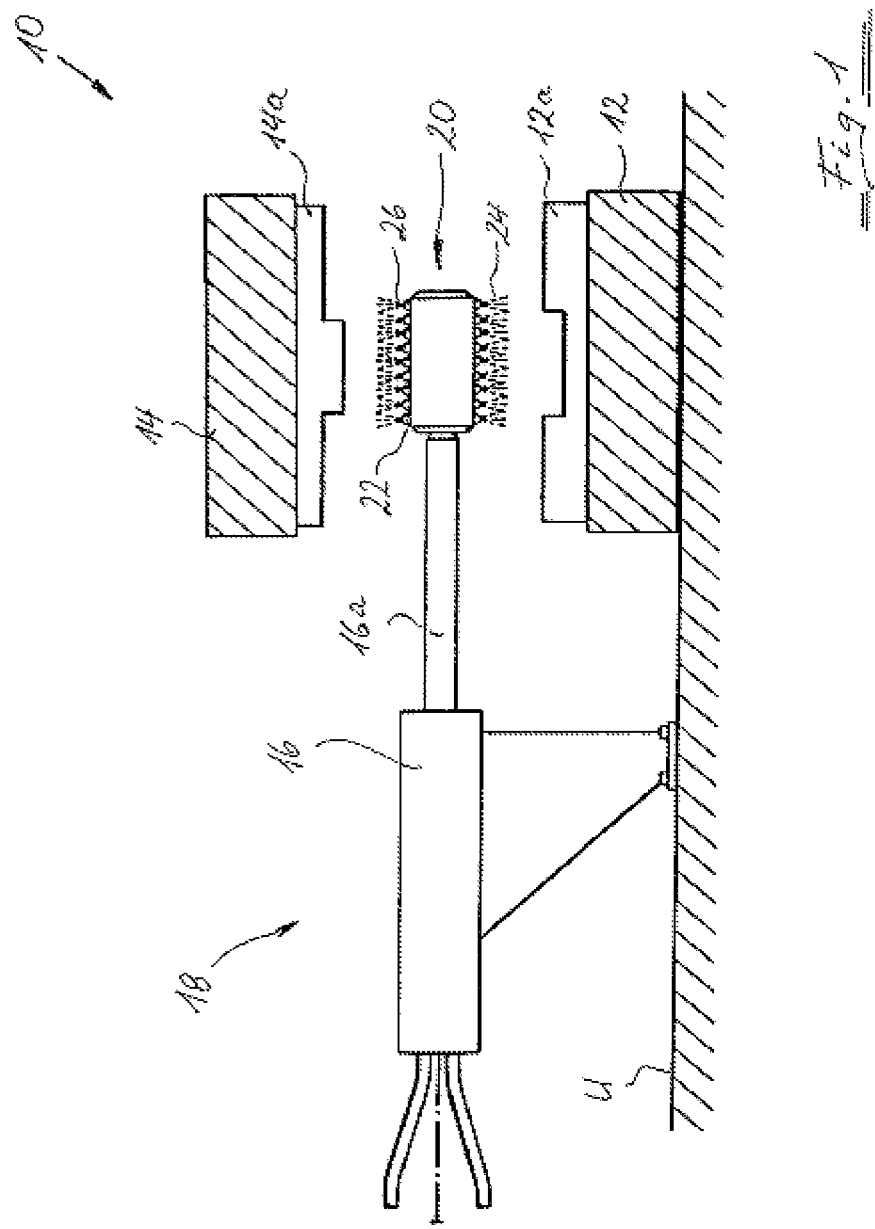
FIG. 1 shows a roughly schematic diagram of a mold spraying device, in which the inventive spraying tool is used.

In a roughly schematic diagram, FIG. 1 shows a drop-forging device 10 as an example of a device for hot and cold shaping, in which the inventive spraying tool 20 may be used. The drop-forging device 10 comprises a lower press ram 12, which is fixedly mounted on a building floor U, and an upper press ram 14, which is movable back and forth by means of devices that are not shown here. In this way, the two mold halves 12a and 14a of the two press rams 12 and 14 may be brought close to one another to form a press space for shaping a workpiece or may be moved apart from one another to form a sufficient space for insertion of the spraying tool 20. The latter situation is illustrated in FIG. 1. To be able to insert the spraying tool 20 between the two mold halves 12a and 14a, it is mounted on the arm 16a of a robot 16, which is only shown in roughly schematic form in FIG. 1. Instead of a robot 16 having a robot arm 16a that can only be extended and/or shortened, as shown in FIG. 1, a modern multiaxial robot may of course also be used. The robot 16 and a spraying tool 20 together form a mold spraying device 18.

Since it is not the design of the device 10 for hot and/or cold shaping or the design of the robot 16, but rather the design of the spraying tool 20 that is important here, and these parts may also be of a traditional design, a more detailed explanation will not be given here in this regard.

As also shown in FIG. 1, the spraying tool 20 comprises two opposing rows of spray elements 22, namely a row 24 assigned to the lower mold half 12a and a row 26 assigned to the upper mold half 14a.

Figure 2:
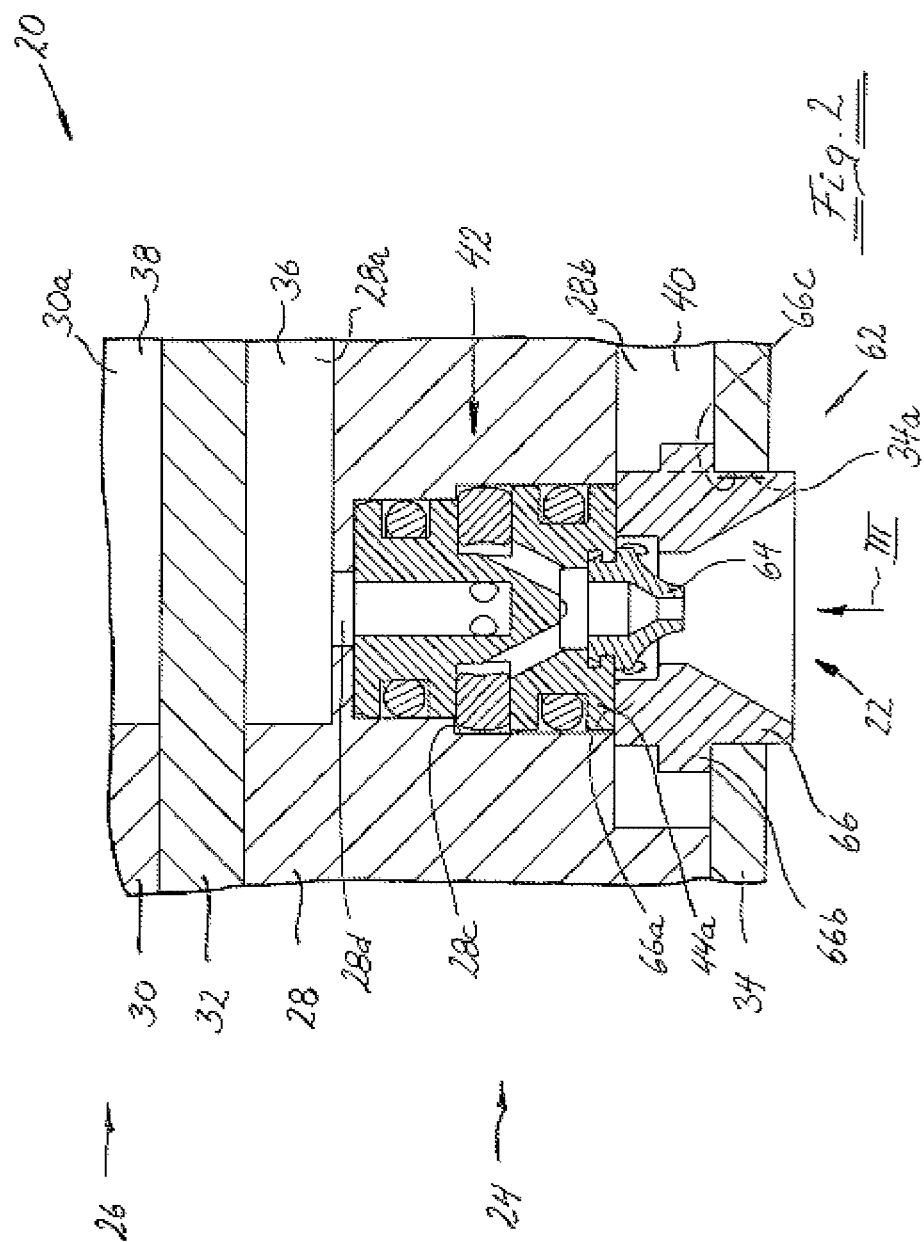
FIG. 2 shows an enlarged diagram of a detail of the inventive spraying tool.

According to FIG. 2, the spraying tool 20 is constructed by a sandwich design. It comprises a first main plate 28, assigned to the lower row 24 of spray elements 22, a second main plate 30, assigned to the upper row 26 of spray elements 22, a dividing plate 32 for separating the two main plates 28 and 30, a cover plate 34, assigned to the first main plate 28, and a cover plate (not shown), assigned to the second main plate 30. Recesses 28a and 30a are formed in the two main plates 28 and 30 and are covered by the dividing plate 32, thus forming supply lines 36 and 38 for working medium. Similarly, additional recesses are formed on the side of the main plates 28 and 30 facing away from the recesses 28a and 30a, only the recess 28b of which is shown in FIG. 2. This additional recess 28b is covered by the cover plate 34, thus forming a supply line 40 for blasting air, by means of which the working medium dispensed by the spray elements 22 is atomized. The dividing plate 32, the two main plates 28 and 30 and the two cover plates 34 are held against one another by suitable fastening means, e.g., by screw bolts and nuts.

In a rapid movement of the spraying tool 20 into or out of the space between the two press halves 12 and 14, there is the risk that at least for the lower row 24 of spray elements 22, working medium may escape from the supply line 36 and the lower spray elements 22 under the influence of inertia. To prevent this, according to the invention, a separate valve unit 42 is assigned to each spray element 22. The valve unit 42 is accommodated in a pot-shaped recess 28c, the pot bottom of which is connected to the working medium supply line 36 via a passage 28d.

Figure 3:
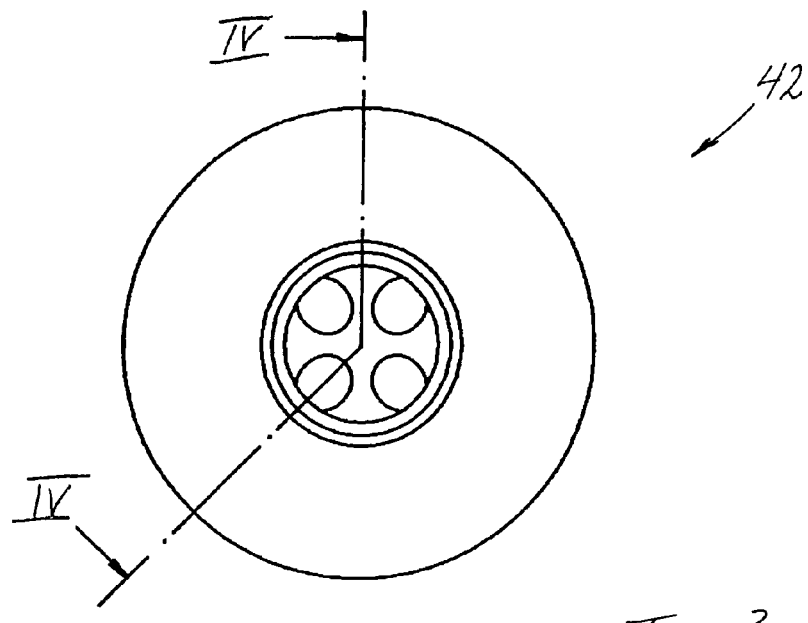
FIG. 3 shows a top view of the valve unit of the spray element shown in FIG. 2, seen here from the direction of the arrow III in FIG. 2.
Figure 4:
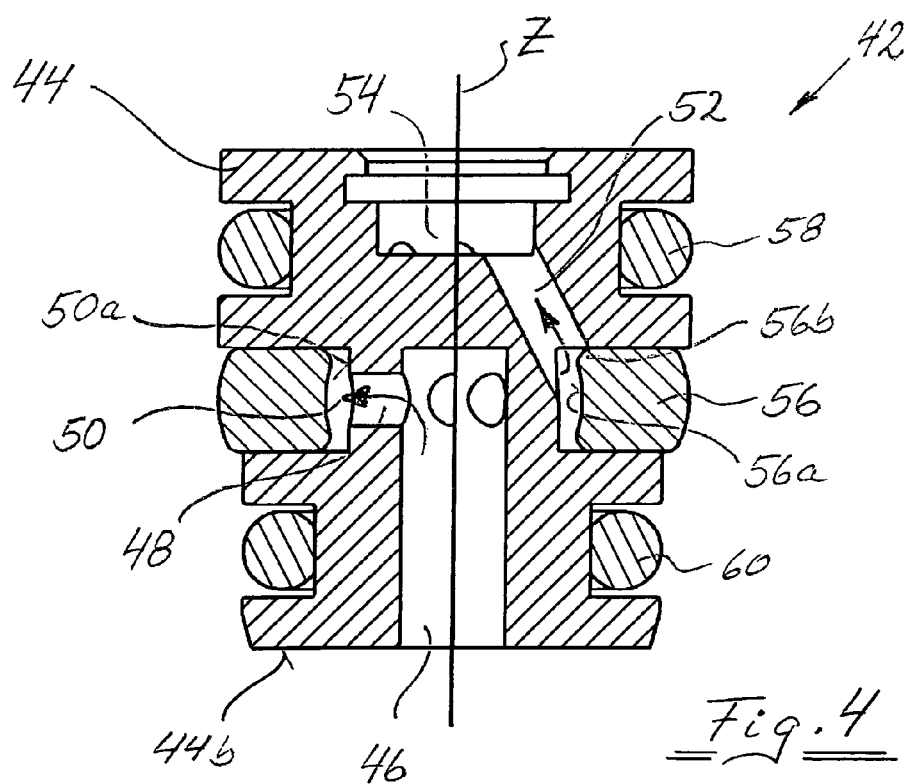
FIG. 4 shows a sectional view of the valve unit along line IV-IV in FIG. 3.

With reference to FIGS. 3 and 4, the design of the valve unit 42 will now be discussed in greater detail. The valve unit 42 comprises a base body 44, designed essentially to be cylindrically symmetrical, from whose one end face 44b a tapping channel 46 leads away and extends essentially along the cylinder axis Z into the base body 44. In deviation from the strict cylindrical symmetry, four radial channels 48, which open into a ring face 50a forming the bottom of a ring groove 50, lead away from the internal end of the tapping channel 46. Four additional channels 52, which run obliquely inward with respect to the cylinder axis Z, lead out from this ring groove 50 at locations which are each offset by approximately 45° with respect to the mouth openings of the channels 48 and open into a dispensing recess 54 surrounding the cylinder axis Z, through which the working medium emerges from the valve unit 42 again.

A valve ring 56 made of rubber material and having an essentially square or rectangular cross section is arranged in the ring groove 50. The diameter of the valve ring 56 is such that in the unloaded state, free of external forces, it is in contact with the bottom 50a of the ring groove 50, a predetermined prestress being provided, if desired. Due to the fact that the surface 56a of the valve ring 56 on the inside radially is designed to be concave, the corners 56b of the valve ring 56 are compressed slightly in this case, so they can act as sealing lips especially effectively and can prevent unwanted escape of working medium. If the working medium coming from the tapping channel 46 is in contact with the bordering surface 56a of the valve ring 56 with pressure, then it widens the valve ring 56 when this pressure exceeds a predetermined value. This state is illustrated in FIG. 4. Based on the displacement of the valve ring 56, the working medium can flow starting from the tapping channel 46 through the channels 48, the ring groove 50 and the additional channels 52 to the dispensing recess 54. As soon as the pressure of the working medium subsides, the valve ring 56 contracts again due to its inherent elasticity and prevents the working medium from leaking out of the channels 48 into the other channels 52.

The valve function provided by the valve ring 56 reliably prevents working medium from leaking out of the spray elements 22 due just to inertia with a rapid movement of the spraying tool 20. If the inherent elasticity of the rubber material of the valve ring 56 is insufficient to provide the valve function, it is possible to consider additionally prestressing the valve ring 56 from its outside, e.g., by means of compressed air or suitable spring elements. Indeed, in this case one might even consider completely omitting the inherent elasticity. The additional prestress could also be utilized to control the flow rate of working medium through the valve unit 42.

FIG. 4 also shows two sealing elements 58 and 60 designed as traditional O-rings, serving to seal the valve unit 42 in the receptacle recess 28c of the main plate 28.

In the exemplary embodiment shown in FIG. 2, the dispensing nozzle 62 is designed in two parts. In particular, it comprises a nozzle mouthpiece 64, which engages with the dispensing recess 54 of the valve unit 42 and serves to eject working medium, and an air-guiding nozzle 66, which serves to eject blasting air that is used to atomize the working medium according to the external mixing principle. The air-guiding nozzle 66 passes through an opening 34a in the cover plate 34.

Furthermore, FIG. 2 shows that neither the valve unit 42 nor the air-guiding nozzle 66 is designed with a thread. Instead, the valve unit 42 is simply inserted into the recess 28c in the main plate 28 and is held there by the air-guiding nozzle 66 by the fact that the latter is in contact at its inner end face 66a with the outer end face 44a of the base body 44 of the valve unit 42. The air-guiding nozzle 66 in turn has a ring shoulder 66b with which it is in contact with the section of the inner bordering surface of the cover plate 34 surrounding the opening 34a. Essentially, however, it is also conceivable to omit the ring shoulder 66b and to screw the air-guiding nozzle 66 into the opening 34a, as indicated at 66c. In the latter case, it is possible to replace the valve unit 42 without therefore having to remove the entire cover plate 34 from the spraying tool 20.

It is of course also conceivable to design the dispensing nozzle 62 as a one-piece design. Furthermore, the spray angle of the dispensing nozzle 62 may be selected through its corresponding design. Regardless of that, however, the same valve unit 42 may always be used.

It should also be added that the recesses 28a and 28b may be created in the main plate 28 by milling, for example. Additionally or alternatively, however, it is also possible to provide these recesses in the main plate already during their shaping. For example, a plurality of recesses that are not interconnected but which are then connected by removing individual partitions, e.g., by milling, to form a channel system of the desired course, might be provided in molding.

It should also be pointed out that a dispersion of graphite and water, for example, may be used as the working medium.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A spraying tool for use with a mold spraying device for spraying at least one section of a mold wall of a mold with working medium, the spray tool comprising:

a plurality of spray elements for dispensing working medium; and at least one working medium supply line, which carries working medium to the plurality of spray elements, wherein at least some of the spray elements whose spray nozzles point downward during operation are each equipped with a separate valve unit next to the spray nozzle, the valve unit having a valve element elastically prestressed into a closed position, in which it stops the dispensing of working medium, but under the influence of a hydraulic and/or pneumatic pressure, it can be brought into an open position in which it enables the dispensing of working medium, wherein the valve unit has a working medium inlet channel providing fluid communication between the working medium supply line and at least one tapping channel, the at least one tapping channel providing fluid communication between the working medium inlet channel and a valve chamber, with at least one dispensing channel being in fluid communication between the valve chamber and an outlet opening of the valve unit, with the valve element being accommodated in the valve chamber, wherein at least one radial channel opens into a wall section that forms a valve seating surface for the valve element, and wherein a cross section of the valve element is rectangular, with a concave portion defined between neighboring corners of the cross section being arranged to face the wall section so that at least one of neighboring corners is structured and arranged to act as a sealing lip.

2. The spraying tool according to claim 1, wherein at least one of the spray elements atomizes the working medium.

3. The spraying tool according to claim 1, wherein the spraying tool includes a main body having a pot-shaped recess for accommodating at least one of the valve units and a cover plate securable to the main body for securing the valve unit within the pot-shaped recess.

4. The spraying tool according to claim 3, wherein the spray nozzle is held by the cover plate of the spraying tool in operational connection to the valve unit.

5. The spraying tool according to claim 4, wherein the spray nozzle is bolted to the cover plate.

6. The spraying tool according to claim 4, wherein the spray nozzle is disposed within an opening in the cover plate.

7. The spraying tool according to claim 1 wherein the valve element is made of rubber material.

8. The spraying tool according to claim 7, wherein the valve element is ring shaped.

9. The spraying tool according to claim 8, wherein both of the at least one neighboring corners are structured and arranged to act as sealing lips.

10. The spraying tool according to claim 9, wherein the effect of the elastic prestress of the valve element is supported by a control medium acting on the valve element in the closing direction.

11. The spraying tool according to claim 10, wherein the working medium supply line is provided in a main body of the spraying tool as a recess in a first surface of the main body.

12. The spraying tool according to claim 11, wherein a blasting air supply line is provided as a recess in the main body of the spraying tool, said recess being provided in a second surface of the main body opposite the first surface.

13. The spraying tool according to claim 12, wherein the spraying tool comprises two main bodies separated by a partition, with the main bodies having their spray elements dispensing working medium in essentially opposite directions.

14. A spraying tool for use with a mold device having a mold having an upper wall and a lower wall, the spraying tool for spraying at least one section of one of the mold walls of a mold with working medium, the spraying tool comprising:
at least one working medium supply line in fluid communication with a working medium source; and
a plurality of spray elements in fluid communication with the working medium supply line, the spray elements having a first plurality of spray elements having spray nozzles that point upward for dispensing working medium towards the upper wall of the mold, and a second plurality of spray elements having spray nozzles that point downward for dispensing working medium toward the lower wall of the mold;
wherein at least some of the spray elements whose spray nozzles point downward are equipped with a separate valve unit adjacent a respective spray nozzle, the valve unit having a channel in fluid communication with the working medium supply line and a valve element elastically prestressed into a closed position in the channel, wherein the valve element inhibits the dispensing of working medium, and the valve element capable of, under the influence of a hydraulic and/or pneumatic pressure, being brought into an open position wherein the valve element increases the dispensing of working medium,
wherein the valve unit has a working medium inlet channel providing fluid communication between the working medium supply line and at least one tapping channel, the at least one tapping channel providing fluid communication between the working medium inlet channel and a valve chamber, with at least one dispensing channel being in fluid communication between the valve chamber and an outlet opening of the valve unit, with the valve element being accommodated in the valve chamber,
wherein at least one radial channel opens into a wall section that forms a valve seating surface for the valve element, and
wherein a cross section of the valve element is rectangular, with a concave portion defined between neighboring corners of the cross section being arranged to face the wall section so that at least one of neighboring corners is structured and arranged to act as a sealing lip.

15. The spraying tool according to claim 14 wherein the valve element is made of rubber material.

16. The spraying tool according to claim 15, wherein the valve element is ring shaped.

17. The spraying tool of claim 14, wherein the channel comprises a ring groove and the valve element comprises a rubber valve ring supported in ring groove.

18. A mold spraying device comprising:
a mold having an upper wall and a lower wall; and
a spraying tool for spraying at least one section of one of the mold walls of a mold with working medium, the spraying tool comprising:
at least one working medium supply line in fluid communication with a working medium source; and a plurality of spray elements in fluid communication with the working medium supply line, the spray elements having a first plurality of spray elements having spray nozzles that point upward for dispensing working medium towards the upper wall of the mold, and a second plurality of spray elements having spray nozzles that point downward for dispensing working medium toward the lower wall of the mold;
wherein at least some of the spray elements whose spray nozzles point downward are equipped with a separate valve unit adjacent a respective spray nozzle, the valve unit having a channel in fluid communication with the working medium supply line and a valve element elastically prestressed into a closed position in the channel wherein the valve element inhibits the dispensing of working medium, the valve element capable of, under the influence of a hydraulic and/or pneumatic pressure, being brought into an open position wherein the valve element increases the dispensing of working medium,
wherein the valve unit has a working medium inlet channel providing fluid communication between the working medium supply line and at least one tapping channel, the at least one tapping channel providing fluid communication between the workin medium inlet channel and a valve chamber, with at least one dispensing channel being in fluid communication between the valve chamber and an outlet opening of the valve unit, with the valve element being accommodated in the valve chamber,
wherein at least one radial channel opens into a wall section that forms a valve seating surface for the valve element, and
wherein a cross section of the valve element is rectangular, with a concave portion defined between neighboring corners of the cross section being arranged to face the wall section so that at least one of neighboring corners is structured and arranged to act as a sealing lip.

* * * * *